US012770407B2

(12) United States Patent
Yahata

(10) Patent No.: US 12,770,407 B2
(45) Date of Patent: Oct. 20, 2026

(54) VEHICLE CONTROL SYSTEM AND CONTROL METHOD

(71) Applicant: HONDA MOTOR CO., LTD., Minato-ku (JP)

(72) Inventor: Kazuki Yahata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 18/897,294

(22) Filed: Sep. 26, 2024

(65) Prior Publication Data

US 2025/0148804 A1 May 8, 2025

(30) Foreign Application Priority Data

Nov. 7, 2023 (JP) ................................ 2023-189804

(51) Int. Cl.

| | |
|---|---|
| ***G06V 20/58*** | (2022.01) |
| ***B60W 60/00*** | (2020.01) |
| ***G07C 5/08*** | (2006.01) |
| ***G08G 1/16*** | (2006.01) |

(52) U.S. Cl.

CPC ........... *G06V 20/58* (2022.01); *B60W 60/005* (2020.02); *G07C 5/0808* (2013.01); *G08G 1/166* (2013.01); *B60W 2540/229* (2020.02)

(58) Field of Classification Search

CPC ... G06V 20/58; G07C 5/0808; B60W 60/005; B60W 2540/229; B60W 50/14; G08G 1/166

See application file for complete search history.

(56) References Cited

U.S. PATENT DOCUMENTS

| | | | | |
|---|---|---|---|---|
| 10,239,450 | B1 * | 3/2019 | Englander | B60Q 9/008 |
| 2017/0366935 | A1 * | 12/2017 | Ahmadzadeh | H04M 1/72457 |
| 2018/0072313 | A1 * | 3/2018 | Stenneth | B60W 30/09 |
| 2018/0272963 | A1 * | 9/2018 | Meyhofer | B60W 50/023 |
| 2018/0281748 | A1 * | 10/2018 | Murase | G06F 21/44 |
| 2020/0377107 | A1 * | 12/2020 | Fung | G06V 10/82 |
| 2022/0126832 | A1 * | 4/2022 | Ewert | B60W 10/24 |

FOREIGN PATENT DOCUMENTS

| | | |
|---|---|---|
| JP | 2011-113366 | 6/2011 |
| JP | 2018-060310 | 4/2018 |
| JP | 2022-529828 | 6/2022 |
| JP | 2023-100304 | 7/2023 |

OTHER PUBLICATIONS

Japanese Office Action for Japanese Patent Application No. 2023-189804 mailed Jun. 10, 2025.

* cited by examiner

*Primary Examiner* — Russell Frejd

(74) *Attorney, Agent, or Firm* — Amin, Turocy & Watson, LLP

(57) ABSTRACT

A vehicle control system includes a plurality of external sensors configured to detect an object near a vehicle, and a control device connected to the plurality of external sensors, the control device includes a state detection part configured to detect a state of the vehicle, and a plurality of processing parts, each of the plurality of processing parts performs information processing using output of some or all of the plurality of external sensors, and on the basis of the detection result of the state detection part, a combination of the plurality of external sensors and the plurality of processing parts in an ON state and a combination of the plurality of external sensors and the plurality of processing parts in the OFF state are switched.

7 Claims, 10 Drawing Sheets

VEHICLE CONTROL SYSTEM AND CONTROL METHOD

CROSS-REFERENCE TO RELATED APPLICATION

Priority is claimed on Japanese Patent Application No. 2023-189804, filed Nov. 7, 2023, the content of which is incorporated herein by reference.

BACKGROUND OF THE INVENTION

Field of the Invention

The present invention relates to a vehicle control system, and a control method.

Description of Related Art

In recent years, efforts to provide access to sustainable transportation systems that take into consideration the most vulnerable traffic participants are becoming more active. To achieve this, research and development into automatic driving technology is being focused on to further improve transportation safety and convenience. Automatic driving technology, advanced driving assistance, and the like are supported by many sensors and processors, and the corresponding increase in energy consumption is becoming an issue. For example, Japanese Unexamined Patent Application, First Publication No. 2018-60310, discloses switching from a first state, in which automatic driving is performed without restrictions, to a second state, in which some or all of the automatic driving is restricted, on the basis of degradation information of a battery that stores electric power for traveling.

SUMMARY OF THE INVENTION

The circumstances under which automatic driving and driving assistance functions should be turned on or off change from moment to moment not only depending on the battery deterioration status, but also on the environment in which the vehicle is placed. In the technology in the related art, since the automatic driving function is restricted solely based on the battery state, it was sometimes not possible to reduce energy consumption with proper judgment according to the vehicle state.

An aspect of the present invention is directed to providing a vehicle control system and a control method that are capable of reducing energy consumption with proper judgment according to a state of a vehicle. This aspect of the present invention contributes to development of a sustainable transportation system.

A vehicle control system and a control method according to the present invention employ the following configuration.

(1) A vehicle control system according to an aspect of the present invention includes a plurality of external sensors configured to detect an object near a vehicle; and a control device connected to the plurality of external sensors, the control device including: a state detection part configured to detect a state of the vehicle; and a plurality of processing parts, each of the plurality of processing parts performing information processing using output of some or all of the plurality of external sensors, and on the basis of the detection result of the state detection part, a combination of the plurality of external sensors and the plurality of processing parts in an ON state and a combination of the plurality of external sensors and the plurality of processing parts in the OFF state are being switched.

(2) In the aspect of the above-mentioned (1), the plurality of processing parts include a first processing part configured to perform warnings related to moving objects approaching the vehicle when there is a possibility of an occupant getting off the vehicle, and when the state of the vehicle detected by the state detection part is a first state which satisfies a condition including a vehicle stopped state and a door lock is released, the first processing part and an external sensor which the first processing part uses for the information processing are set to the ON state, and the other processing parts and external sensors are set to the OFF state.

(3) In the aspect of the above-mentioned (1), the plurality of processing parts include a second processing part configured to perform surrounding monitoring of the vehicle during stoppage of the vehicle, and when a state of the vehicle detected by the state detection part is a second state which satisfies a condition including a vehicle stopped state and a battery mounted on the vehicle is charged from an outside, the second processing part and an external sensor which the second processing part uses for the information processing are set to the ON state, and the other processing parts and external sensors are set to the OFF state.

(4) In the aspect of the above-mentioned (1), the plurality of processing parts include a third processing part selectively operable between a first mode of autonomously moving the vehicle in a state in which surrounding monitoring by an occupant is required and a second mode of autonomously moving the vehicle in a state in which the surrounding monitoring by the occupant is not required, and when a state of the vehicle detected by the state detection part is a third state in which the second mode is not executable and the first mode is executable, a number of external sensors set to the ON state is smaller than in a fourth state in which the second mode is executable.

(5) In the aspect of the above-mentioned (1), the plurality of processing parts includes a fourth processing part operated in a first mode of autonomously moving the vehicle in a state in which surrounding monitoring by an occupant is required, and a fifth processing part operated in a second mode of autonomously moving the vehicle in a state in which the surrounding monitoring by the occupant is not required, and when a state of the vehicle detected by the state detection part is a third state in which the second mode is not executable and the first mode is executable, a number of external sensors set to the ON state is smaller than in a fourth state in which the second mode is executable, and the fifth processing part in the third state is set to the OFF state.

(6) In the aspect of the above-mentioned (1), the vehicle control system further includes a notification part configured to notify information to an occupant; and a driving state controller configured to causes the notification part to notify that information processing by a processing part in the ON state is not started until turning ON of some of the plurality of external sensors and the plurality of processing parts have finished, when a part of some of the plurality of external sensors and the plurality of processing parts that are in the OFF state becomes to the ON state turned ON from a state in which some of the plurality of external sensors and the plurality of processing parts are in the OFF state.

(7) In the aspect of the above-mentioned (1), the vehicle control system further includes a driving state controller configured to suppress departure of the vehicle until some of the plurality of external sensors and the plurality of processing parts that are in the OFF state have finished to become the ON state, when a state of the vehicle detected by the state detection part changes as the vehicle leaves the stopped state.

(8) A control method according to another aspect of the present invention includes a plurality of external sensors configured to detect an object near a vehicle, and a control device connected to the plurality of external sensors, the control method including causing the control device to: detect a state of the vehicle; operate independently as a plurality of processing parts so that each of the plurality of processing parts performs information processing using output of some or all of the plurality of external sensors, and switch between a combination of the plurality of external sensors and the plurality of processing parts in the ON state and a combination of the plurality of external sensors and the plurality of processing parts in the OFF state on the basis of the state of the vehicle.

According to the aspects of the above-mentioned (1) to (8), it is possible to reduce energy consumption with proper judgment according to a state of a vehicle.

DETAILED DESCRIPTION OF THE INVENTION

Hereinafter, embodiments of a vehicle control system and a control method of the present invention will be described with reference to the accompanying drawings.

First Embodiment

Figure 1:
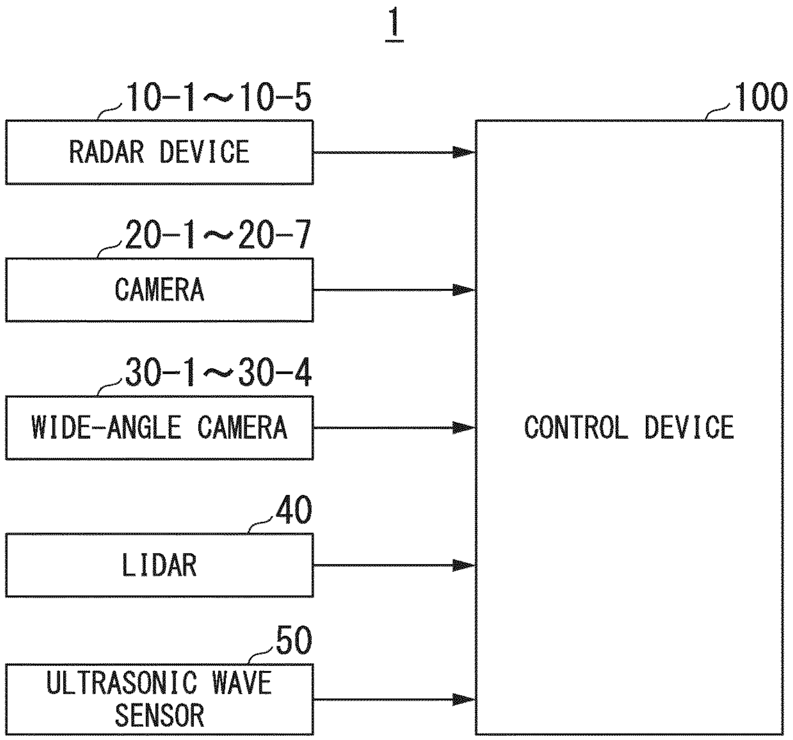
FIG. 1 is a configuration view of a vehicle control system.

FIG. 1 is a configuration view of a vehicle control system 1. The vehicle control system 1 includes a plurality of external sensors exemplified in the drawings, and a control device 100. The external sensor includes, for example, some or all of radar devices 10-1 to 10-5, cameras 20-1 to 20-7, wide-angle cameras 30-1 to 30-4, a LIDAR (Light Detection and Ranging) 40, and a plurality of ultrasonic wave sensors 50. These devices (the sensors, the cameras, the radar devices, and the like) output information (signals, images, coordinates, and the like) showing objects near the vehicle M to the control device 100 using an area around (outside) a vehicle M as a detection range.

The detection range of the radar device 10-1 is set in front of the vehicle M, and the detection range of the radar devices 10-2 to 10-5 is set diagonally forward and diagonally rearward of the vehicle. Each of the radar devices 10-1 to 10-5 emits electromagnetic waves and outputs to the control device 100 a distance, an orientation and the like to the detected object on the basis of the reflected waves generated when the electromagnetic waves are reflected by an object.

The detection range of the cameras 20-1 and 20-2 is set in the front of vehicle M, the detection range of the cameras 20-3 to 20-6 is set in the side of vehicle M, and the detection range of the camera 20-7 is set in the rear of vehicle M. Each of the cameras 20-1 to 20-7 performs repeated imaging and outputs the captured images to the control device 100. Further, some or all of the cameras 20-1 to 20-7 may be provided with an image processing device that analyzes the image and recognizes the position of the object.

The detection range of the wide-angle camera 30-1 is set in the front of the vehicle M, the detection range of the wide-angle camera 30-2 and 30-3 is set in the side of the vehicle M, and the detection range of the wide-angle camera 30-4 is the rear of the vehicle M. Each of the wide-angle cameras 30-1 to 30-4 is, for example, a digital camera to which a fisheye lens is attached, and images a space around the vehicle M at an angle higher than that of the cameras 20-1 to 20-7.

The detection range of the LIDAR 40 is a certain range centered on the front of the vehicle M. The LIDAR 40 radiates infrared light around the vehicle M, and outputs to the control device 100 the distance, the orientation, and the like, to the object detected on the basis of the reflected waves generated by reflecting the infrared light by the object.

The ultrasonic wave sensors 50 are installed around corners of the vehicle M, and emit ultrasonic waves while outputting to the control device 100 the distance to the detected object on the basis of the reflected waves generated when the ultrasonic waves are reflected by the object.

Figure 2:
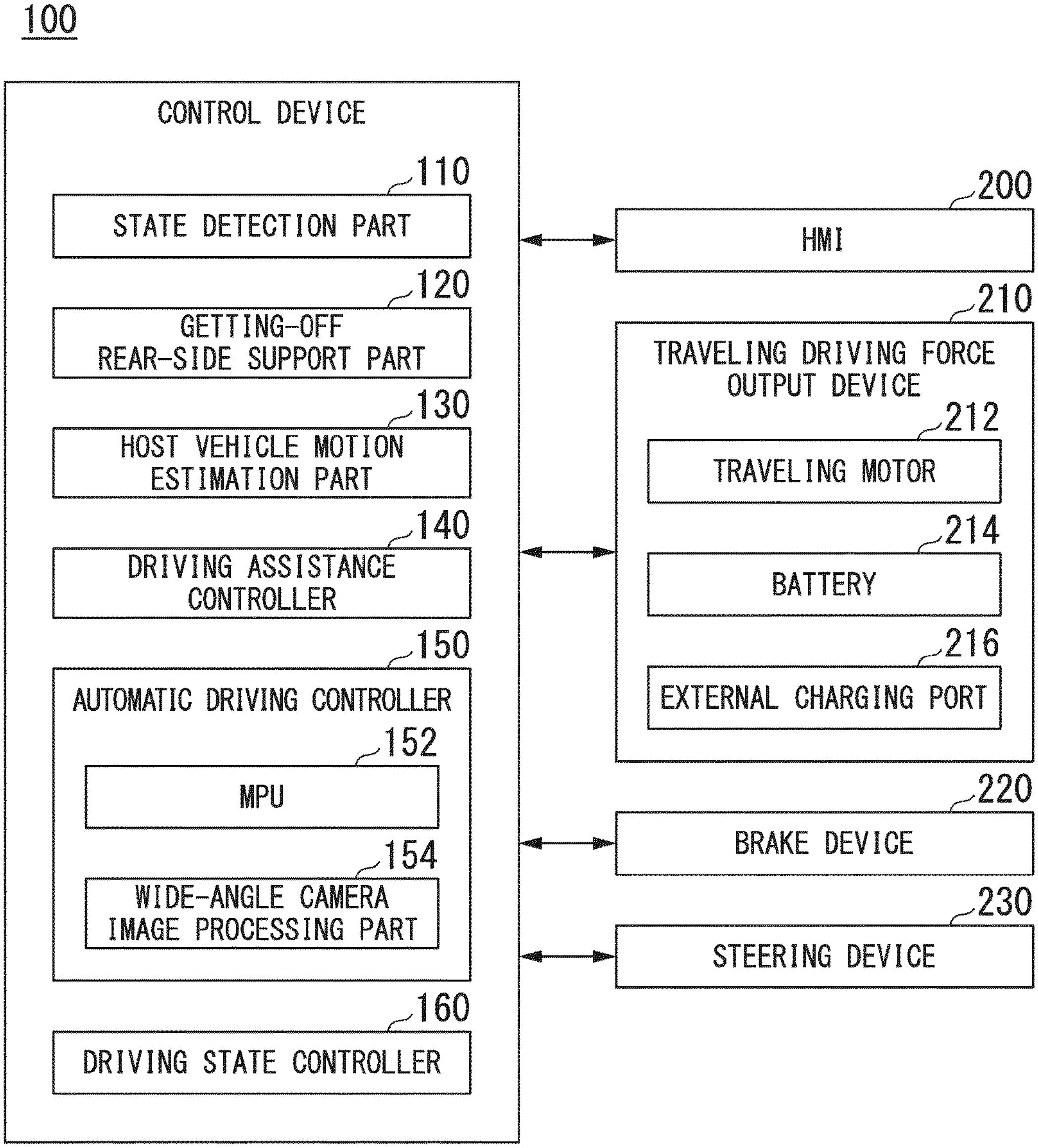
FIG. 2 is a configuration view of a control device.

FIG. 2 is a configuration view of the control device 100. The control device 100 includes, for example, a state detection part 110, a getting-off rear-side support part 120, a host vehicle motion estimation part 130, a driving assistance controller 140, an automatic driving controller 150, and a driving state controller 160. The automatic driving controller 150 includes a map positioning unit (MPU) 152, and a wide-angle camera image processing part 154. Some or all of these components are examples of "a plurality of processing parts" in Claims, and realized by executing a program (software) using a hardware processor such as a central processing unit (CPU) or the like. The plurality of processing parts are operated, for example, independently. Some or all of these components may be realized by hardware (circuit part; including circuitry) such as large scale integration (LSI), a application specific integrated circuit (ASIC), a field-programmable gate array (FPGA), a graphics processing unit (GPU), a system on chip (SOC), or the like, and may be realized by cooperation of software and hardware. The program may be stored in advance on a storage device (a storage device with a non-transitory storage medium) such as a hard disk drive (HDD) or flash memory, or may be stored on a removable storage medium (non-transitory storage medium) such as a DVD or a CD-ROM and installed by inserting the storage medium into a drive device. Each of "the plurality of processing part" is to perform information processing using output of some or all of "the plurality of external sensors."

The control device 100 may not be realized by a single processor, but may instead perform distributed processing by a plurality of processors. For example, the processors for functioning as the main parts of the getting-off rear-side support part 120, the driving assistance controller 140, the MPU 152, the wide-angle camera image processing part 154, and the automatic driving controller 150 other than the MPU 152 and the wide-angle camera image processing part 154 may each exist as separate entities.

The control device 100 is connected to devices such as a human machine Interface (HMI) 200, a traveling driving force output device 210, a brake device 220, a steering device 230, and the like, which are control targets. These devices will be described first.

The HMI 200 presents various pieces of information to the occupant of the vehicle M and accepts input operations from the occupant. The HMI 200 includes various types of display devices, an indicator, a speaker, a buzzer, a touch panel, a switch, a key, and the like. The HMI 200 is an example of "a notification part."

The traveling driving force output device 210 outputs a traveling driving force (torque) for traveling the vehicle M to driving wheels. The traveling driving force output device 210 includes, for example, a combination of an internal combustion engine, a traveling motor 212, a gearbox, and the like, and an electronic control unit (ECU) configured to control them. In addition, the traveling driving force output device 210 includes a battery 214 that stores electric power used by the traveling motor 212, and an external charging port 216 configured to accept charging from an external charger. The ECU controls the above components according to information input from the control device 100 or information input from the driving operator (not shown).

The brake device 220 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the control device 100 or the information input from the driving operator so that the brake torque corresponding to the braking operation is output to each wheel. The brake device 220 may include a mechanism configured to transmit a hydraulic pressure generated by an operation of the brake pedal included in the driving operator to the cylinder via a master cylinder as a backup. Further, the brake device 220 is not limited to the configuration described above, but may be an electronically controlled hydraulic brake device that controls the actuator according to information input from the control device 100 and transmits the hydraulic pressure of the master cylinder to the cylinder.

The steering device 230 includes, for example, a steering ECU, and an electric motor. The electric motor applies a force to, for example, a rack and pinion mechanism and changes a direction of steered wheels. The steering ECU drives the electric motor and changes the direction of the steered wheels according to the information input from the control device 100 or the information input from the driving operator.

It returns to description of the control device 100. The state detection part 110 detects a state of the vehicle M on the basis of the output of various vehicle sensors (a shift position sensor, a speed sensor, a door lock sensor, a driving assistance switch, and the like; not shown) mounted on the vehicle M, or the information obtained from the MPU 152. The states of the vehicle M include, for example, a first state, a second state, a third state, a fourth state (all of which are described below), and the like. Further, there may be other states for the vehicle M, but description related to all of them will be omitted.

Figure 3:
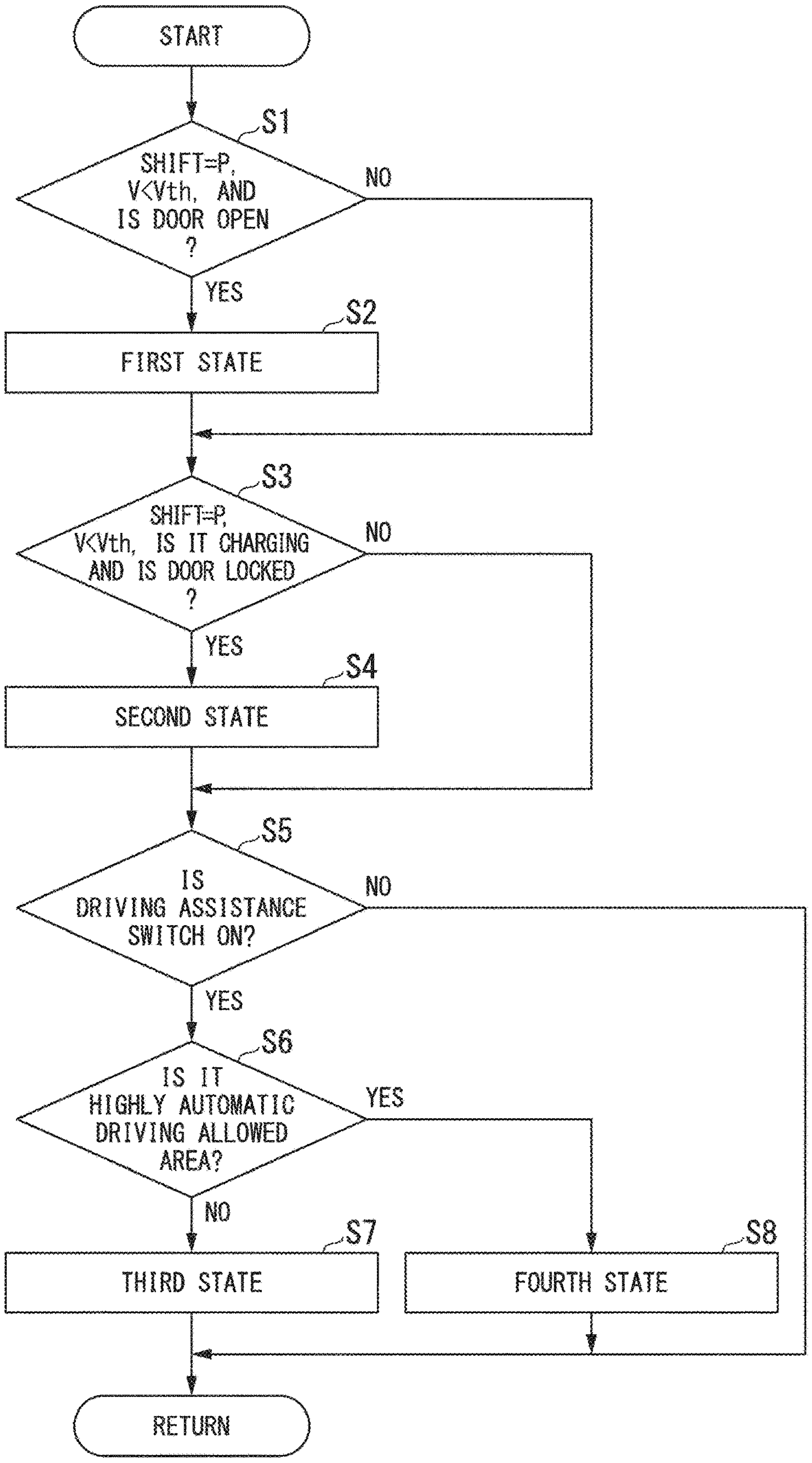
FIG. 3 is a flowchart showing an example of a flow of processing executed by a state detection part.

FIG. 3 is a flowchart showing an example of a flow of processing executed by the state detection part 110. First, the state detection part 110 determines whether the shift position of the vehicle M is P (parking), the speed V of the vehicle M is less than a threshold Vth, and (at least one of) the doors of the vehicle M are unlocked (step S1). The threshold Vth is a small value of about 1 [km/h], and a value used to determine whether the vehicle M is stopped or not. When a positive determination result is obtained in step S1, the state detection part 110 determines that the state of the vehicle M is the first state (step S2). The first state is the state in which the vehicle M is stopped and the occupant may get off.

When a negative determination result is obtained in step S1, the state detection part 110 determines whether the shift position of the vehicle M is P (parking), the speed V of the vehicle M is less than the threshold Vth, the battery 214 is being charged externally via the external charging port 216, and (all of) the doors of the vehicle M are locked (step S3). When a positive determination result is obtained in step S3, the state detection part 110 determines whether the state of the vehicle M is the second state (step S4). The second state is a state in which the vehicle M is stopped and the battery 214 is being charged externally.

When a negative determination result is obtained in step S3, the state detection part 110 determines whether the driving assistance switch is in an ON state (step S5). The driving assistance switch is a switch that is installed at a desired position in a passenger compartment the vehicle M. When the driving assistance switch is in the OFF state, the state detection part 110 does not determine the state of vehicle M and ends the processing of this flowchart. In this case, for example, all external sensors and processing parts may be controlled in the OFF state or in a low electric power consumption standby state.

When the driving assistance switch is in the ON state, the state detection part 110 determines whether the location of the vehicle M is within a highly automatic driving allowed area by querying the MPU 152 (step S6). The highly automatic driving allowed area is an area on a main line of a toll road, such as a highway. When a negative determination result is obtained in S6, the state detection part 110 determines that the state of the vehicle M is the third state (step S7). Meanwhile, when a positive determination result is obtained in S6, the state detection part 110 determines that the state of the vehicle M is the fourth state (step S8). The third state is a state in which since the vehicle M is traveling in an urban area or the like, the vehicle M cannot move autonomously in a state monitoring of the surroundings by an occupant is not necessary. The fourth state is a state in which the vehicle M is traveling in a highly automatic driving allowed area and so does not require surrounding monitoring by occupants, allowing the vehicle M to move autonomously (however, other conditions such as a speed and the like are imposed in order to actually eliminate the need for surrounding monitoring by occupants).

When the getting-off rear-side support part 120 detects a moving object, such as another vehicle, approaching from the rear side while the vehicle M is in the first state, it issues an alarm by lighting up an indicator on a front pillar or a side mirror. In addition, the getting-off rear-side support part 120 blinks the indicator and outputs an alarm sound to the HMI 200 when there is a possibility that the door opened by an occupant of the vehicle M to get off may collide with another vehicle passing on the side of the vehicle M. The getting-off rear-side support part 120 is an example of "the first processing part."

The host vehicle motion estimation part 130 estimates a momentum (displacement) of the vehicle M by performing the same processing as a so-called inertial navigation system on the basis of outputs of various vehicle sensors (a speed sensor, an acceleration sensor, a yaw rate sensor, a steering angle sensor, and the like; not shown) mounted on the vehicle M.

The driving assistance controller 140 performs various types of driving assistance control, for example, lane keeping control, speed maintaining control, inter-vehicular distance control, lane deviation alarm or pedestrian detection alarm control, and the like.

The automatic driving controller 150 moves the vehicle M regardless of the operation of the occupant in the vehicle M. A mode of the automatic driving controller 150 may include a plurality of modes. For example, the plurality of modes include a first mode in which the vehicle M moves autonomously in a state in which surrounding monitoring by an occupant is required, and a second mode in which the vehicle M can move autonomously in a state in which surrounding monitoring by an occupant is not required. Further, in the state in which the surrounding monitoring by the occupant is required, a gripping state of the steering wheel or a gaze direction or the like of the occupant (driver) is detected and when it is determined that the surrounding monitoring by the occupant is not performed, the control in the first mode is also stopped. In addition, the second mode may be a so-called traffic jam pilot (TJP) mode, i.e., a mode that is implemented when traveling on a motorway at a predetermined speed or less. In addition, when the state of the vehicle M is the second state, the automatic driving controller 150 can perform surrounding monitoring of the vehicle M using the wide-angle cameras 30-1 to 30-4, and can also perform various types of processing such as anti-theft and the like. The automatic driving controller 150 is an example of "the second processing part" or "the third processing part." The MPU 152 is connected to a positioning device such as a Global Positioning System (GPS) receiver or the like, holds map information on a storage device such as an HDD, a flash memory, or the like, and has a recommended lane determination function.

The map information is more detailed than the map information used by the navigation device. The MPU 152 divides the route on the map provided by the navigation device (not shown) into a plurality of blocks (for example, every 100 m in relation to the direction of advance of the vehicle M) and determines a recommended lane for each block by referring to the map information. When a branch point is present on the route on the map, the MPU 152 determines the recommended lane such that the vehicle M can travel along a reasonable route to advance to a branch destination.

The wide-angle camera image processing part 154 performs processing of converting the wide-angle images captured by each of the wide-angle cameras 30-1 to 30-4 into normal images.

The driving state controller 160 controls a driving state of the vehicle M on the basis of the processing result of each part of the control device 100. More details will be described below.

In the vehicle control system 1 of the embodiment, on the basis of the detection result of the state detection part 110, a combination of "a plurality of external sensors" and "a plurality of processing parts" that results in the ON state and a combination of "a plurality of external sensors" and "a plurality of processing parts" that results in the OFF state are switched. Accordingly, it is possible to achieve reduction in energy consumption with proper judgment according to the state of the vehicle. Hereinafter, each will be described separately.

Figure 4:
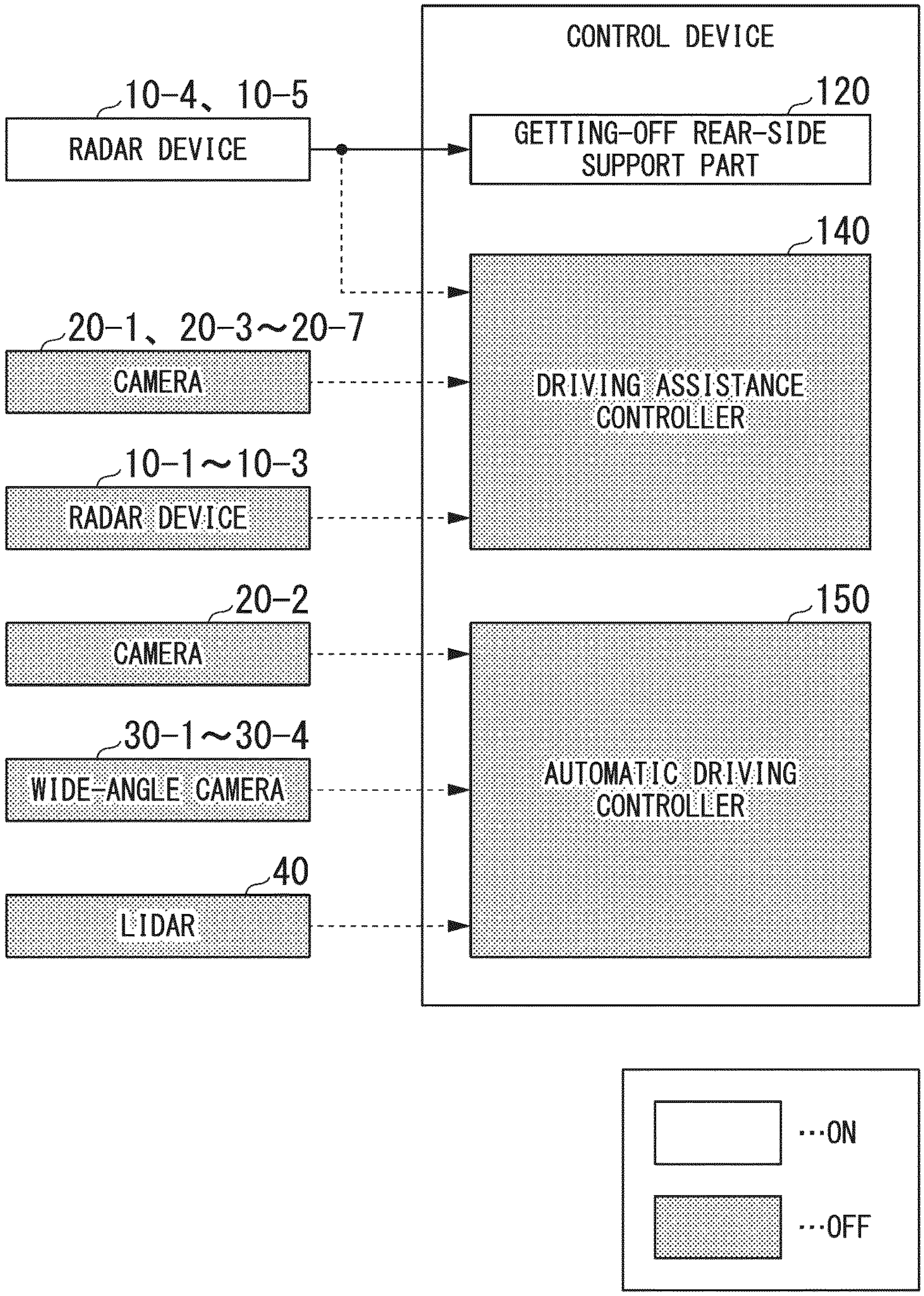
FIG. 4 is a view showing an example of a state of an external sensor and a processing part when a state of a vehicle is a first state.

FIG. 4 is a view showing an example of a state of an external sensor and a processing part when the state of the vehicle M is the first state. In the drawings, hatched components indicate that they are in the OFF state. The same applies to FIG. 5 and below. As shown, in the first state, the radar devices 10-4 and 10-5, and the getting-off rear-side support part 120, whose detection range is set in the rear side of the vehicle M, are in the ON state, and the other external sensors, the driving assistance controller 140, and the automatic driving controller 150 are set to the OFF state. Further, the instruction to switch between the ON state and the OFF state may be issued by the state detection part 110, or each processing part may be performed autonomously.

Figure 5:
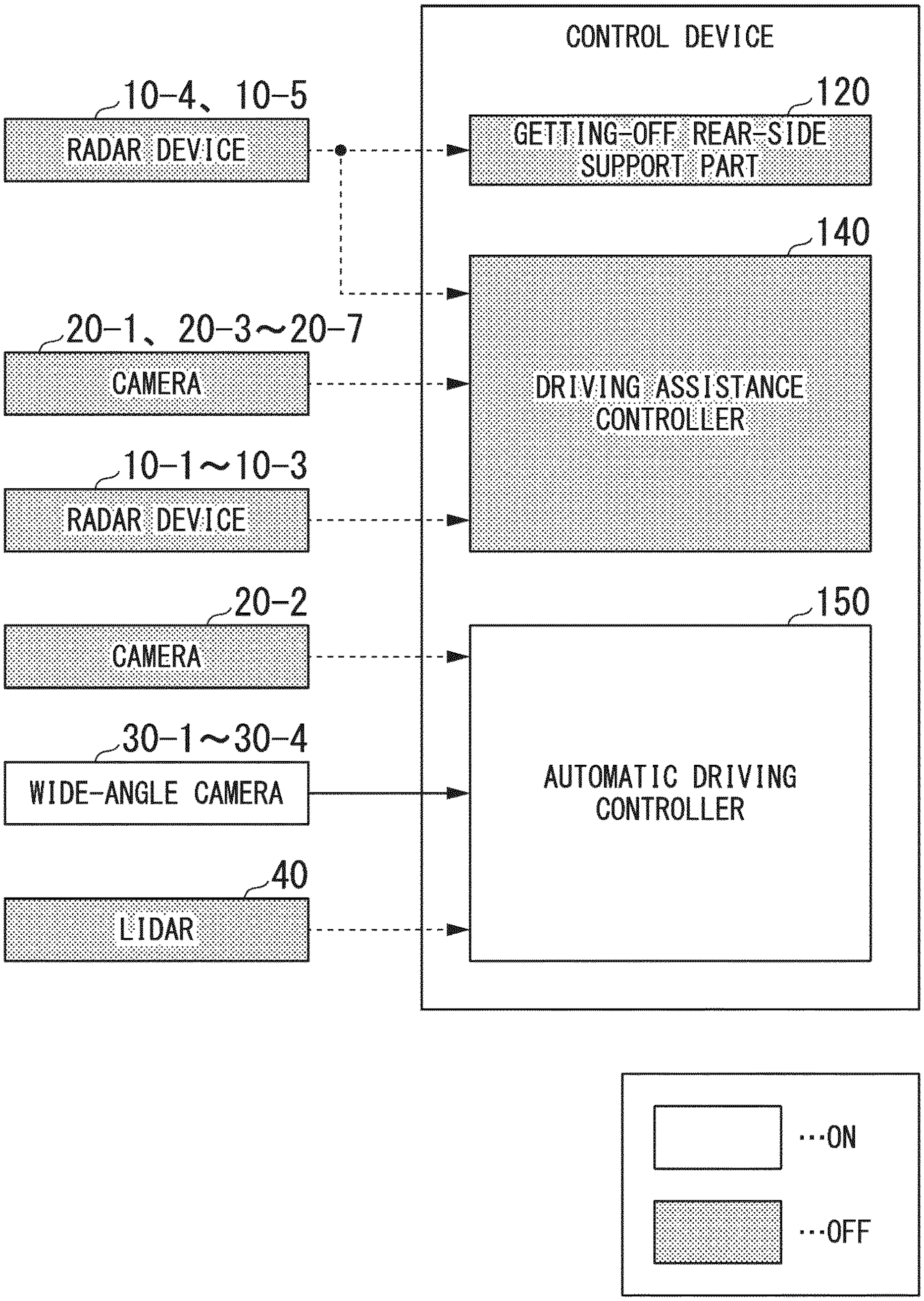
FIG. 5 is a view showing an example of a state of the external sensor and the processing part when a state of the vehicle is a second state.

FIG. 5 is a view showing an example of a state of the external sensor and the processing part when the state of the vehicle M is the second state. As shown, in the second state, the wide-angle cameras 30-1 to 30-4 and the automatic driving controller 150 are in the ON state, and the other external sensors, the getting-off rear-side support part 120 and the driving assistance controller 140 are in the OFF state.

Figure 6:
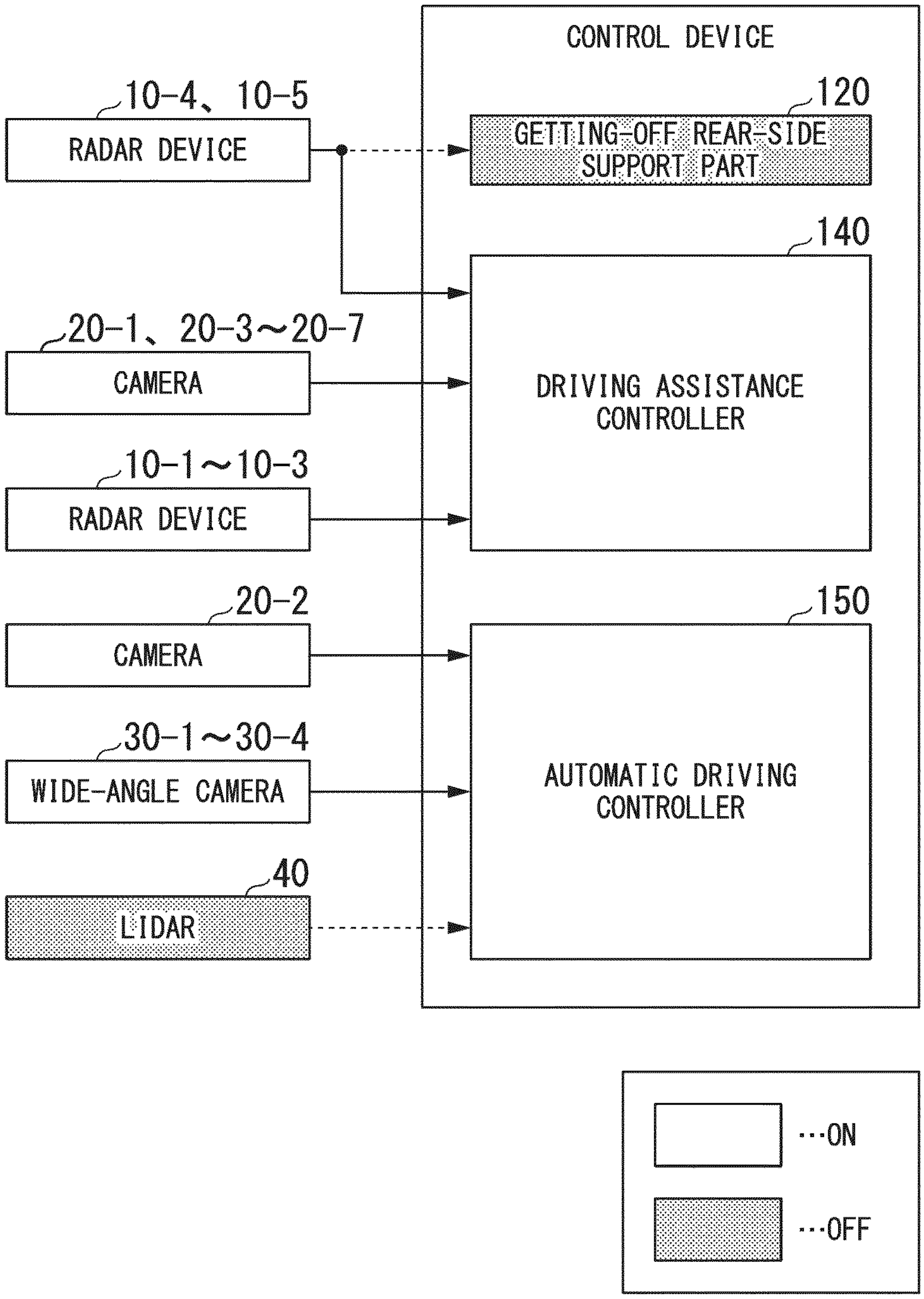
FIG. 6 is a view showing an example of a state of the external sensor and the processing part when a state of the vehicle is a third state.
Figure 7:
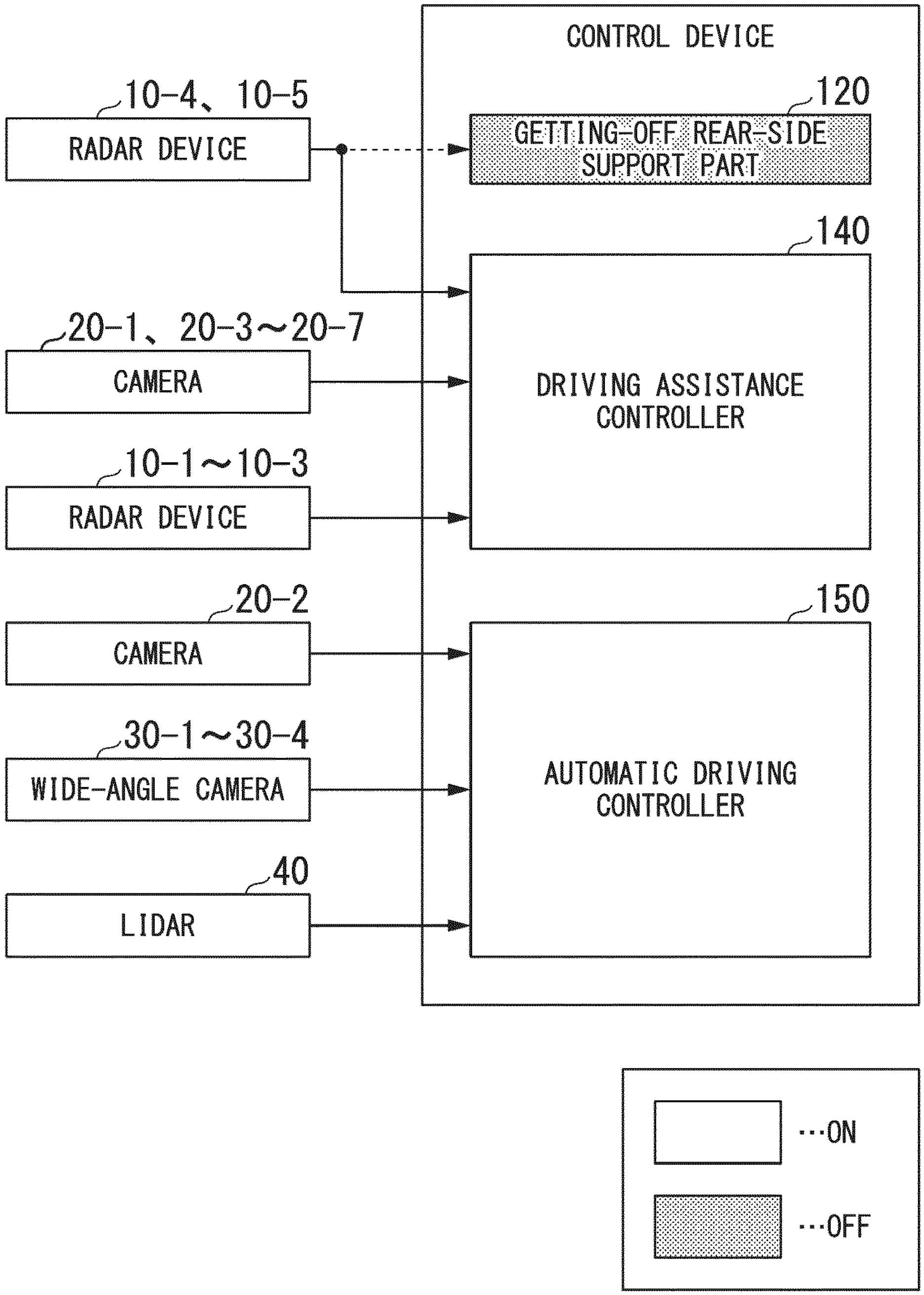
FIG. 7 is a view showing an example of a state of the external sensor and the processing part when a state of the vehicle is a fourth state.

FIG. 6 is a view showing an example of a state of the external sensor and the processing part when the state of the vehicle M is the third state, and FIG. 7 is a view showing an example of a state of the external sensor and the processing part when the state of the vehicle M is the fourth state. In the third state as shown, the radar devices 10-1 to 10-5, the cameras 20-1 to 20-7, the wide-angle cameras 30-1 to 30-4, the driving assistance controller 140 and the automatic driving controller 150 are in the ON state, and the getting-off rear-side support part 120 and the LIDAR 40 are in the OFF state. When it is in the fourth state, the LIDAR 40 is also in the ON state. In this way, in the case of the third state in which the second mode is not executable but the first mode is executable, the number of external sensors that are in the ON state is smaller than in the fourth state in which the second mode is executable.

Figure 8:
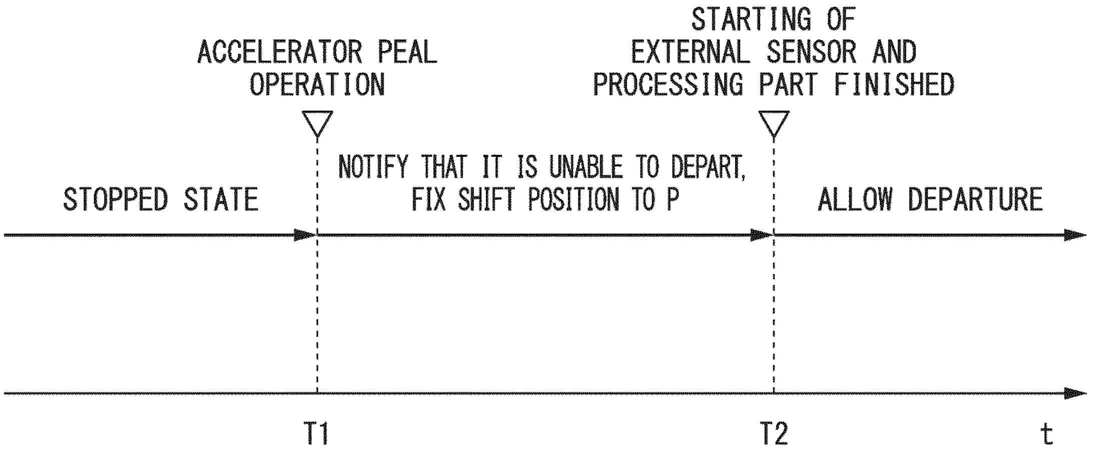
FIG. 8 is a view for describing contacts of processing by a driving state controller.

When a state in which some of a plurality of external sensors and a plurality of processing parts are in the OFF state is changed to a state in which some of the plurality of external sensors and the plurality of processing parts in the OFF state are in the ON state, the driving state controller 160 notifies the occupant using the HMI 200 that information processing by the processing part that is in the ON state will not be started until changing of a part of the plurality of external sensors and the plurality of processing parts to ON state is finished. Here, if the state of the vehicle M before the state change is a stopped state, that is, if the state of the vehicle M detected by the state detection part 110 is changed due to the vehicle M getting out from the stopped state, the driving state controller 160 suppresses the starting of the vehicle until changing of a part of the plurality of external sensors and the plurality of processing parts that are in the OFF state to the ON state is finished. FIG. 8 is a view for describing content of processing by the driving state controller 160. Up until time T1, the vehicle M is in the stopped state, and is in the first state, the second state, and other states described above. When the accelerator pedal is operated at time T1, the driving state controller 160 causes the HMI 200 to notify that starting is not possible and does not allow the vehicle M to start driving by, for example, fixing the shift position in P (parking). When the activation of the predetermined external sensor and the processing part is completed at time T2, the driving state controller 160 changes the shift position from P and allows the drive starting of the vehicle. Accordingly, this prevents the vehicle M from drive starting in a state in which the necessary driving assistance function is not activated, and prevents the occupant from misunderstanding the failure of the driving start as a malfunction. According to the above-mentioned first embodiment, it is possible to achieve reduction in energy consumption with proper judgment according to the state of the vehicle.

Second Embodiment

Hereinafter, a second embodiment will be described. In the first embodiment, the automatic driving controller 150 selectively operates in the first mode and the second mode. In the second embodiment, the automatic driving controller 150 includes a first mode execution part 156 (an example of the fourth processing part) operates in the first mode, and a second mode execution part 158 (an example of the fifth processing part) operates in the second mode. The first mode execution part 156 and the second mode execution part 158 may be realized by separate processors, or may be realized by one processor generating two virtual machines.

Figure 9:
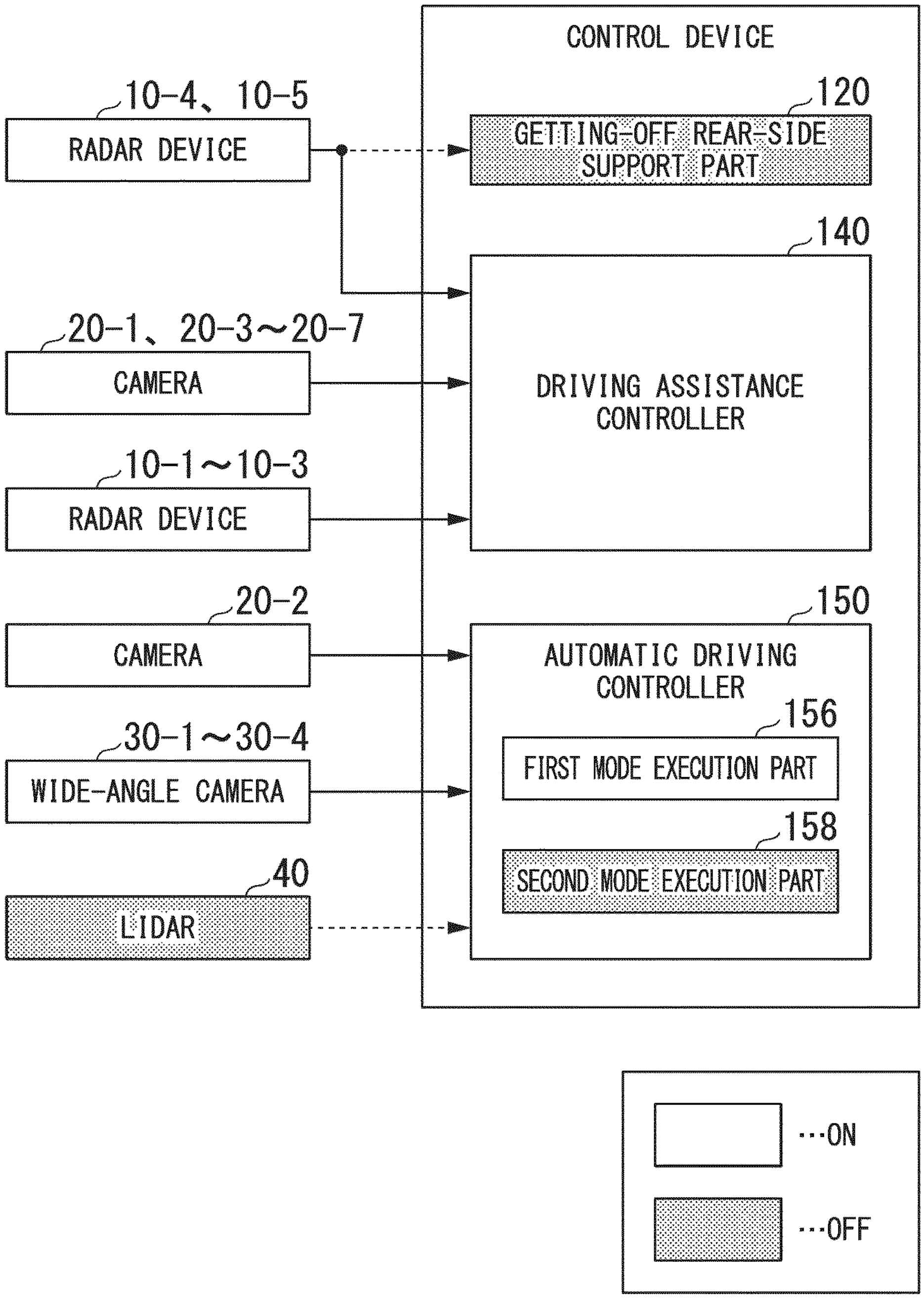
FIG. 9 is a view showing an example of a state of an external sensor and a processing part when a state of a vehicle is a third state in a second embodiment.
Figure 10:
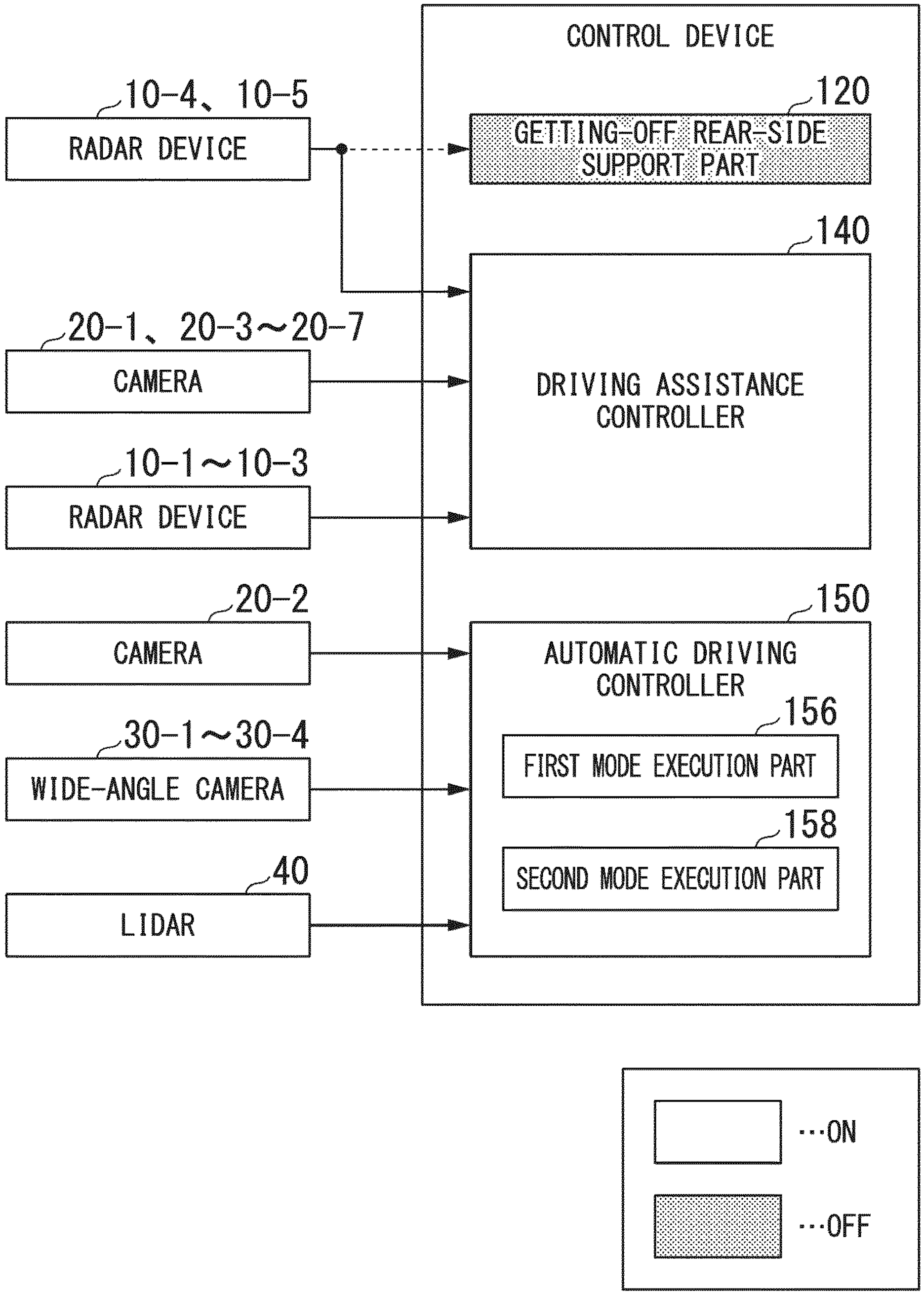
FIG. 10 is a view showing an example of a state of the external sensor and the processing part when a state of the vehicle is a fourth state in the second embodiment.

FIG. 9 is a view showing an example of a state of the external sensor and the processing part when the state of the vehicle M is the third state in the second embodiment, and FIG. 10 is a view showing an example of a state of the external sensor and the processing part when the state of the vehicle M is the fourth state in the second embodiment. According to such a configuration, it is possible to reduce energy consumption more accurately than in the first embodiment.

The above-mentioned embodiment can be expressed as follows.

A control system includes:

- a plurality of external sensors configured to detect an object near a vehicle; and
- a control device connected to the plurality of external sensors, the control device includes:

- a state detection part configured to detect a state of the vehicle; and
- a plurality of processors each connected to a storage medium configured to store instructions readably by computer (computer-readable instructions), each of the plurality of processors performs information processing using output of some or all of the plurality of external sensors, and on the basis of the detection result of the state detection part, a combination of the plurality of external sensors and the plurality of processors in an ON state and a combination of the plurality of external sensors and the plurality of processors in an OFF state are switched.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control system comprising:

a plurality of external sensors configured to detect an object near a vehicle; and a control device connected to the plurality of external sensors, wherein the control device includes:

a state detection part configured to detect a state of the vehicle; and a plurality of processing parts, each of the plurality of processing parts performs information processing using output of some or all of the plurality of external sensors, and on the basis of the detection result of the state detection part, a combination of the plurality of external sensors and the plurality of processing parts in an ON state and a combination of the plurality of external sensors and the plurality of processing parts in the OFF state are switched, wherein the plurality of processing parts include a second processing part configured to perform surrounding monitoring of the vehicle during stoppage of the vehicle, and when a state of the vehicle detected by the state detection part is a second state which satisfies a condition including a vehicle stopped state and a battery mounted on the vehicle is charged from an outside, the second processing part and an external sensor which the second processing part uses for the information processing are set to the ON state, and the other processing parts and external sensors are set to the OFF state.

2. The vehicle control system according to claim 1, wherein the plurality of processing parts include a first processing part configured to perform warnings related to moving objects approaching the vehicle when there is a possibility of an occupant getting off the vehicle, and when the state of the vehicle detected by the state detection part is a first state which satisfies a condition including a vehicle stopped state and a door lock is released, the first processing part and an external sensor which the first processing part uses for the information processing are set to the ON state, and the other processing parts and external sensors are set to the OFF state.

3. The vehicle control system according to claim 1, wherein the plurality of processing parts include a third processing part selectively operable between a first mode of autonomously moving the vehicle in a state in which surrounding monitoring by an occupant is required and a second mode of autonomously moving the vehicle in a state in which the surrounding monitoring by the occupant is not required, and when a state of the vehicle detected by the state detection part is a third state in which the second mode is not executable and the first mode is executable, a number of external sensors set to the ON state is smaller than in a fourth state in which the second mode is executable.

4. The vehicle control system according to claim 1, wherein the plurality of processing parts includes a fourth processing part operated in a first mode of autonomously moving the vehicle in a state in which surrounding monitoring by an occupant is required, and a fifth processing part operated in a second mode of autonomously moving the vehicle in a state in which the surrounding monitoring by the occupant is not required, and when a state of the vehicle detected by the state detection part is a third state in which the second mode is not executable and the first mode is executable, a number of external sensors set to the ON state is smaller than in a fourth state in which the second mode is executable, and the fifth processing part in the third state is set to the OFF state.

5. The vehicle control system according to claim 1, further comprising:

a notification part configured to notify information to an occupant; and a driving state controller configured to causes the notification part to notify that information processing by a processing part in the ON state is not started until turning ON of some of the plurality of external sensors and the plurality of processing parts have finished, when a part of some of the plurality of external sensors and the plurality of processing parts that are in the OFF state becomes to the ON state turned ON from a state in which some of the plurality of external sensors and the plurality of processing parts are in the OFF state.

6. The vehicle control system according to claim 1, further comprising a driving state controller configured to suppress departure of the vehicle until some of the plurality of external sensors and the plurality of processing parts that are in the OFF state have finished to become the ON state, when a state of the vehicle detected by the state detection part changes as the vehicle leaves the stopped state.

7. A control method of a vehicle control system including a plurality of external sensors configured to detect an object near a vehicle, and a control device connected to the plurality of external sensors, the control method including causing the control device to:

detect a state of the vehicle;

operate independently as a plurality of processing parts so that each of the plurality of processing parts performs information processing using output of some or all of the plurality of external sensors, perform surrounding monitoring of the vehicle during stoppage of the vehicle by a second processing part included in the plurality of processing parts, switch between a combination of the plurality of external sensors and the plurality of processing parts in the ON state and a combination of the plurality of external sensors and the plurality of processing parts in the OFF state on the basis of the state of the vehicle, and when the state of the vehicle detected by the state detection part is a second state which satisfies a condition including a vehicle stopped state and a battery mounted on the vehicle is charged from an outside, set to the ON state the second processing part and an external sensor which the second processing part uses for the information processing, and set to the OFF state the other processing parts and external sensors.

* * * * *